Oct. 18, 1938.

R. E. SMITH

VAULT BASE

Original Filed Jan. 14, 1935

Re. 20,889

3 Sheets-Sheet 1

Inventor
RALPH E. SMITH,

By

Attorneys

Oct. 18, 1938.
R. E. SMITH
VAULT BASE
Re. 20,889
Original Filed Jan. 14, 1935 3 Sheets-Sheet 2
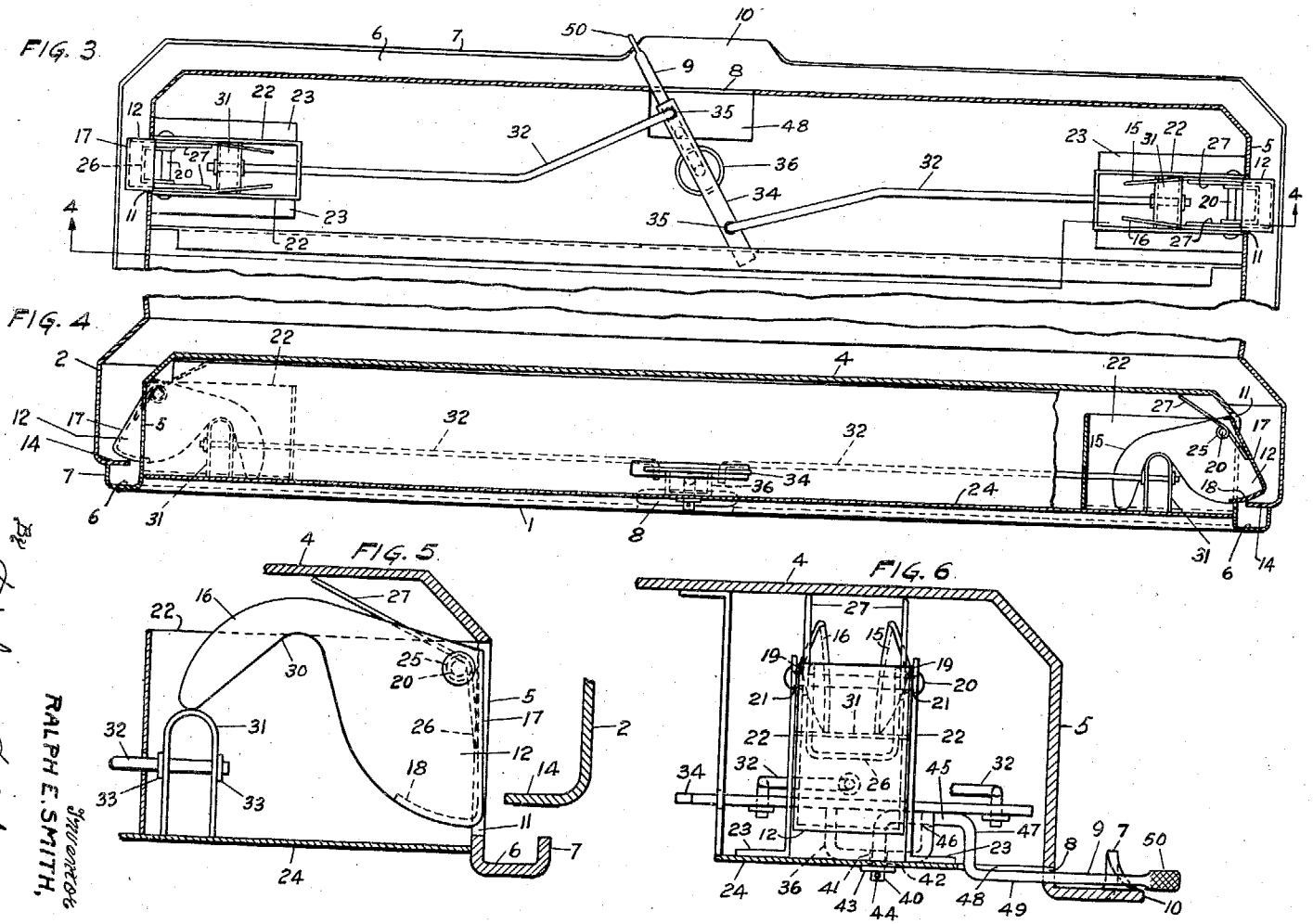
Inventor
RALPH E. SMITH,
By
Attorneys Oct. 18, 1938.

R. E. SMITH

VAULT BASE

Re. 20,889

Original Filed Jan. 14, 1935 3 Sheets-Sheet 3

Inventor

RALPH E. SMITH,

By Fauchin & Fauchin

Attorneys.

Reissued Oct. 18, 1938

Re. 20,889

UNITED STATES PATENT OFFICE 20,889

VAULT BASE

Ralph E. Smith, Galion, Ohio, assignor to The Galion Metallic Vault Company, Galion, Ohio, a corporation of Ohio Original No. 2,087,487, dated July 20, 1937, Serial No. 88,669, July 2, 1936, which is a division of Serial No. 1,600, January 14, 1935, now Patent No. 2,071,585, dated February 23, 1937. Application for reissue October 1, 1937, Serial No. 166,868

10 Claims. (Cl. 27—35)

This invention relates to locking mechanisms, and in particular, to devices for locking the hoods or covers of grave vaults to the bases thereof.

One object of this invention is to provide a locking device for locking the hood to the base of a grave vault at approximately the corners thereof, so as to provide an even tension and latching effect.

Another object is to provide a locking device of this character, wherein the latches are arranged in pairs at each end of the base, each pair being operated by a lever having a handle projecting outside the base.

Another object is to provide a grave vault with a base having a lock box incorporated therein and adapted not only to contain the locking mechanism, but also to add rigidity to the base and further decrease its tendency to sink into the earth.

Another object is to provide a locking system for locking grave vault hoods to the bases thereof, the latching members being connected to an operating lever which extends downward beneath the base and outward beyond it, so that the locking mechanism may be operated by moving the portion of the lever beneath the base in the event that the end of the lever becomes broken off.

Another object is to provide a locking system for locking the hood of a grave vault to the base, wherein the hood is provided with an inwardly bent flange adapted to be engaged by the latching member of the lock, and also to rest upon an upturned lip on the base in such a manner as to permit operation of the lock even though dirt may accidentally have fallen upon the base before the hood is placed over it.

Another object is to provide a reinforcing plate which has the dual purpose of preventing the vault from sinking into the soft ground, and which also serves as the bottom enclosure and support for a portion of the locking mechanism.

It is an object to use the struck-up portion forming a hollow bottom in the base as the side walls and top of the enclosure of which the reinforcing plate forms the bottom support for the actuating and locking mechanism.

It is another object to provide for pivotally supporting the locks of the locking mechanism so they will swing through side openings of the struck-up bottom of the base, while the actuating mechanism connected thereto is pivotally supported on the reinforcing plate at a point centrally between the side walls, so that a handle mounted thereon can project through the side wall of the bottom and over the flange of the bottom to permit the locks on the cover of the vault to be locked. Thus the reinforcing plate supports the lock actuating mechanism, encloses the locking mechanism to prevent the dirt from getting into it and prevents the vault and its base from sinking into the soft ground, while at the same time reinforcing the vault bottom by forming a box-like structure in combination with it.

This application is a division of my copending application, Ser. No. 1,600, filed January 14, 1935, now Patent No. 2,071,585, dated Feb. 23, 1937.

In the drawings:

Figure 3 is a top plan view of the grave vault base shown in Figure 2, with the top thereof broken away to show the details of the latching mechanism.

Figure 4 is a cross section through the end of the grave vault base shown in Figure 3, taken along the line 4—4 of Figure 3.

Figure 5 is an enlarged view, partly in cross section, showing the details of the latching member of Figure 4 in its unlatching position.

Figure 6 is a view similar to Figure 5, but in a plane at right angles thereto.

Figure 1:
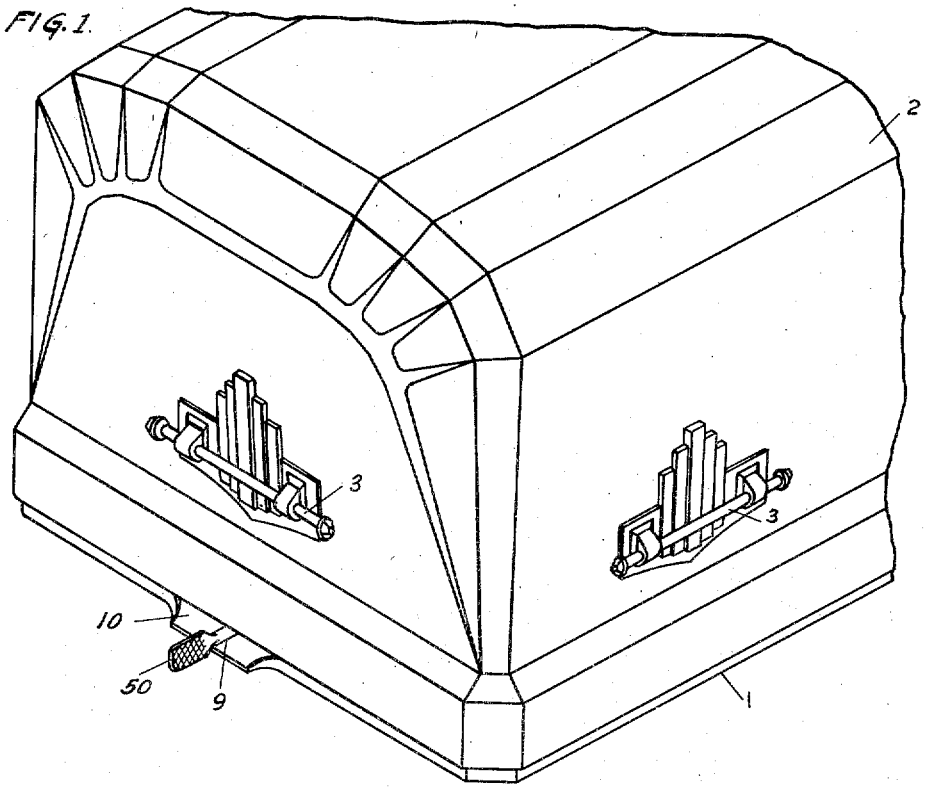
Figure 1 is a perspective view of a grave vault with its hood in position upon its base, and showing the lock-operating lever projecting from the base.

Referring to the drawings in detail, the grave vault embodying the locking device of my invention consists generally of a base 1, having a hood 2, which may be placed with its open side downward upon the base 1. The hood 2 is provided with handles 3 for the convenience of lowering the hood onto the base 1.

Figure 2:
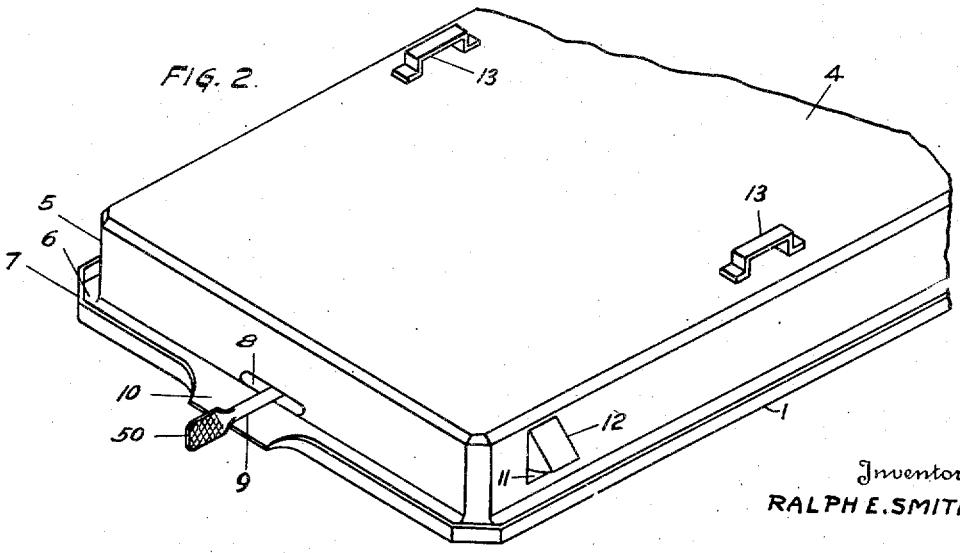
Figure 2 is a perspective view of the base of the grave vault of Figure 1, showing one of the latching members projecting from the side of the base, and the operating lever projecting from the end thereof.

The base 1 comprises a base top plate, indicated by the numeral 4, this having downwardly-extending flanges 5 at its outer edges. The flanges 5 are continued outward and upward to form a groove 6 with an upwardly-projecting flange or lip 7. At each end of the base 1 a slot 8 is cut therethrough to accommodate the operating lever 9 of the locking mechanism, hereinafter described. The lip 7 is flared outward, as at 10 (Figure 2), in order to permit the passage and operation of the latch-operating lever 9. The side flanges 5 of the base 1 are also provided with apertures 11, through which project the latching members 12 (Figure 2). One of these latching members 12 is arranged on each side of the base 1, near the corners thereof, and interconnected to the other and to the operating lever 9 by mechanism described below.

The base top plate 4 is provided with suitable clips 13, which are adapted for securing the casket to the base. The hood 2 is provided at its lower edges with an inwardly extended flange 14, which is adapted to rest upon the lip 7 of the base 1. By this construction, the accidental falling of dirt into the grave before the hood has been lowered will merely fall into the trough 6 and not prevent the operation of the lock. The inwardly-extended flange 14 of the hood 2 serves the further purpose of providing means for the engagement of the latching members 12 (Figure 4).

The latching mechanism (Figures 3 and 4) consist of the previously described latching members 12, extending through the apertures 11 in the side walls 5 of the base 1. Each latching member 12 is of double-walled construction, preferably formed from a single piece of material, having wings 15 and 16 (Figure 6), which are bent toward one another and substantially at right angles to the front face 17 of the latch. A lower portion 18 of the front face 17 is bent backward to form the lower contact surface of the latch 12 (Figures 4 and 5). The horizontal cross section through the latch 12 thus roughly resembles a letter U.

Each latching member 12 is provided with holes 19 in the side wings 15 and 16 thereof, and through these is passed the pivot shaft 20 of the latch (Figures 5 and 6). In the construction shown, the pivot shaft 20 also passes through holes 21 in a pair of angle brackets 22, and the ends of the pivot shaft 20 are enlarged so as to secure the whole together. The bent portions 23 of the angle brackets 22 are secured, preferably by welding, to the base bottom plate 24. Each latching member 12 is thus mounted for free pivoting upon its pivot shaft 20, but is urged into a latching position by means of a looped coil spring 25 (Figures 4 and 5). This spring 25 is roughly U-shaped (Figure 3) and has a forward loop 26, the spring being coiled around the pivot shaft 20 and its arms 27 extended backward and upward into contact with the base plate 4 (Figure 4). The forward loop 26 engages the inner surface of the forward wall 17 of the latching member 12, urging it outward into a latching position. In this position the lower forward surface 18 of the latching member passes over the flange 14 of the grave vault hood 2, thus locking the hood securely to the base 1 and against the upwardly-projecting lip 7 thereof.

The backwardly projecting wings 15 and 16 of each latching member 12 are so formed as to provide notched portions 30, which are arranged to serve as cam surfaces. These notches 30 are arranged to receive the lock slides 31. Each slide 31 consists of a U-shaped member attached to a control rod 32, as by the enlarged portions 33 thereon. Thus when the slide 31 is moved away from the side wall, the latch member will be disengaged from the hood (Figure 5); when the slide 31 is pushed inward toward the side wall 5, however, the upper portion of the slide will enter the notches 30 in the latch wings 15 and 16, allowing the latch member 12 to be rotated downward and outward through its aperture 11 and over the flange 14 of the hood 2.

The oppositely disposed latch members 12 (Figures 3 and 4) are operated simultaneously by their rods 32 through the action of the pivoted bar 34 into which the ends of the rods are inserted as in the holes 35. The bar 34 is secured to a cup-shaped spacer 36, such as by welding, in such a manner that the spacer 36 raises the bar 34 a sufficient distance above the bottom plate 24 of the base 1. The lock-operating rod 9 is likewise secured to the bar 35, as by welding, and is bent in the manner shown in Figure 6. The inner end 40 of the operating rod 9 is bent downward so that it passes through a hole 41 in the spacer 36, and likewise through a hole 42 in the bottom plate 24. A washer 43 and a cotter pin 44 prevent the displacement of the inner end 40 of the control rod 9.

Beyond the inner end 40 the control rod 9 is provided with the horizontally bent portion 45, which passes through a hole 46 in the spacer 36 and beyond this is bent downward in the vertical portion 47 which passes through a slot 48 in the bottom plate 24. Beyond this point the operating rod 9 extends outward in a horizontal portion 49 through the slot 8. By this construction the operating rod 9 may be operated even though its outer end 50 may have been accidentally broken off. This is done by merely moving the horizontal portion 49 in a suitable direction either to lock or unlock the latching mechanism previously described.

Figures 7, 8, 9:
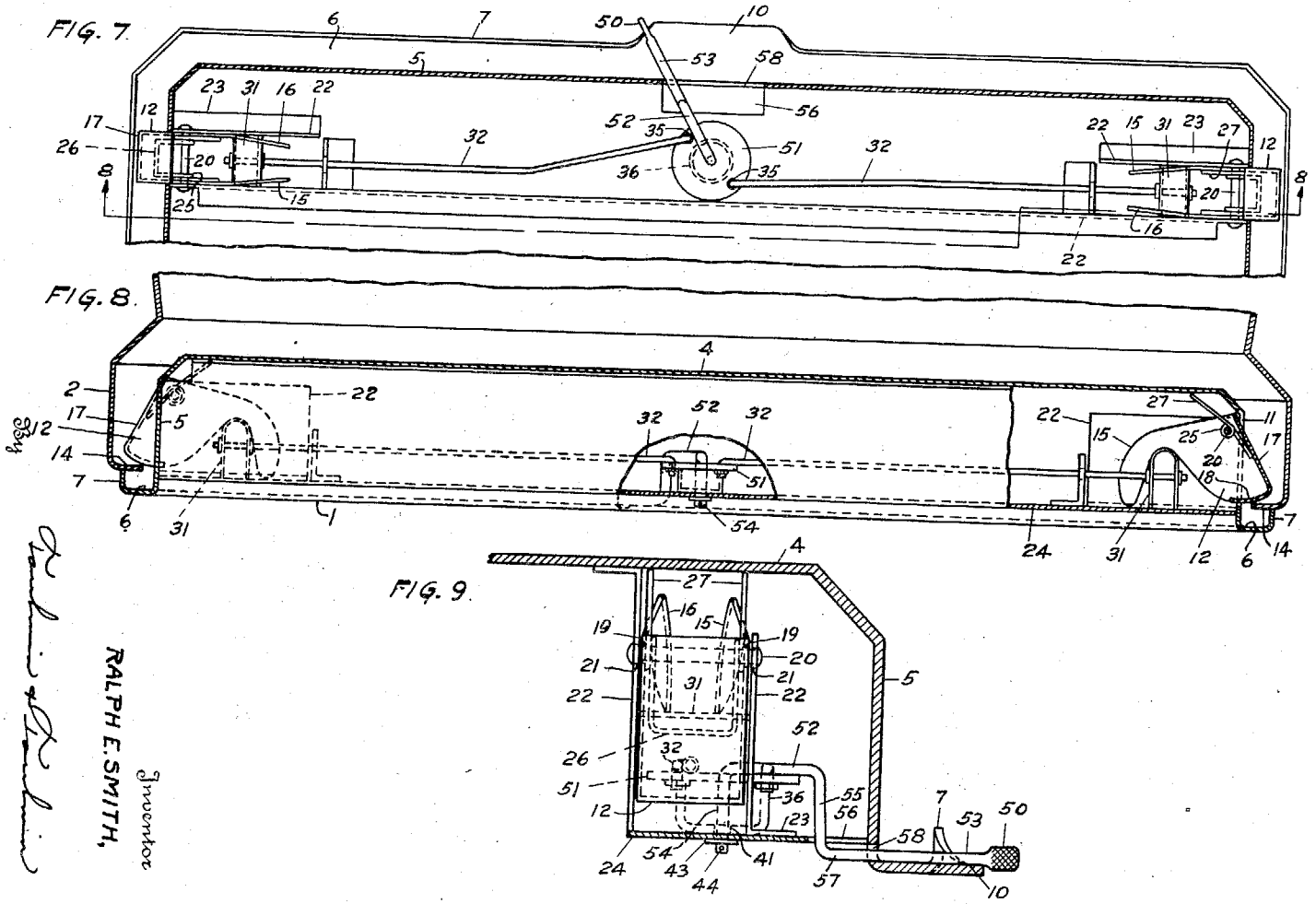
Figure 7 is a view similar to Figure 3, but showing a modified construction.
Figure 8 is a cross section through the modified construction shown in Figure 7.
Figure 9 is a view similar to Figure 6, but showing the modified construction of Figures 7 and 8.

The modified form of latching mechanism shown in Figures 7 to 9, inclusive, is generally similar to that previously described, and similar parts are given corresponding numerals. Instead of the bar 34, however, a disc 51 (Figure 7) is employed to receive the ends of the control rods 32, and to this disc is attached the horizontal portion 52 of the lock-operating rod 53. On either side of the horizontal portion 52 the operating rod 53 is extended downward in vertical portions 54 and 55, the latter portion passing through a slot 56 in the bottom plate 24 (Figure 9), and thereafter is bent outward in a second horizontal portion 57. Thenceforth the portion 57 passes through a slot 58 near the lower edge of the base, and continues over a flange 10 in the outer lip 7 of the base.

The operation of the latching mechanism of my invention has been sufficiently disclosed in describing the construction thereof. To place the hood 2 upon the base 1, the former is merely lowered onto the latter. At the same time the lock-operating lever 9 is moved in such a manner as to draw the latch-control rods 32 toward one another (Figure 3), thus withdrawing the latch members 12 into the interior of the base by way of the apertures 11. When the hood 2 is in its proper position upon the base 1, the lever 9 is moved in the reverse direction, allowing the latch members 12 to pass outward through their apertures 11 and engage the lower flange 14 on the hood 2.

The operation of the modified form of locking mechanism shown in Figures 7 to 9 is substantially similar to that of the form shown in Figures 3 to 6, inclusive. By the box-like construction of the base 1 to contain the locking mechanism, I have provided not only a container for the locking mechanism, but also a construction which adds to the rigidity of the base. This construction also further serves to prevent the vault from sinking into the earth.

When the lever 50 is in locked position it is not necessary to operate the lever, because when setting the top on the base the locks operate automatically. In Figures 3 or 4 the lever stays either in the locking or open position, as shown in Figure 5. Part 34 extends through the box 24 and can be operated to unlock the bar from the top of the vault when the vault is standing on end, or if lever 50 should be broken off.

It will be understood that I desire to comprehend within my invention such modifications as may be necessary to adapt it to varying conditions and uses.

Having thus fully described my invention, what I claim as new and desire to secure by Letters Patent, is:

1. In a grave vault comprising a unitary hood having an offset portion at the bottom thereof terminating at the bottom in an inwardly directed horizontal flange adapted to abut a vertical edge of a U-shaped offset flange on a base fitting within said offset portion and to be engaged at its inner edge and locked on the base by cam-shaped surfaces of spring-pressed latch members mounted in the base and controlled by latch-operating mechanism therein; a unitary base member comprising a platform having downwardly directed flanges terminating in upwardly directed U-shaped offset flanges, and a co-extensive bottom plate parallel to and spaced from the platform and secured to the downwardly directed flanges of the base and having at each end thereof laterally disposed unitary box-like housings for strengthening said base and for inclosing said latching mechanism, said housings having the tops thereof formed by the platform, the bottom thereof formed by the bottom plate, the ends thereof formed by the downwardly directed side flanges and one side thereof formed by the downwardly directed end flange of the base.

2. In a grave vault comprising a unitary hood having an offset portion at the bottom thereof terminating at the bottom in an inwardly directed horizontal flange adapted to abut a vertical edge of a U-shaped offset flange on a base fitting within said offset portion and to be engaged at its inner edge and locked on the base by cam-shaped surfaces of spring-pressed latch members mounted in the base and controlled by latch-operating mechanism therein; a unitary base member comprising a platform having downwardly directed flanges terminating in upwardly directed U-shaped offset flanges and having at each end thereof laterally disposed unitary box-like housings for strengthening said base and for inclosing said latching mechanism, said housings having the tops thereof formed by the platform, the ends thereof formed by the downwardly directed side flanges and one side thereof formed by the downwardly directed end flange of the base.

3. In a grave vault, a hollow unitary base member comprising a platform having downwardly directed flanges terminating in upwardly directed outwardly offset flanges, and a co-extensive bottom plate parallel to and spaced from the platform and secured to the downwardly directed flanges of the base and having at each end thereof laterally disposed unitary box-like housings for strengthening said base and for enclosing latching means associated with said base, said housings having the tops thereof formed by the platform and the bottoms thereof formed by the bottom plate.

4. In a grave vault, a hollow unitary base member comprising a platform having downwardly directed flanges terminating in upwardly directed outwardly offset flanges, and a co-extensive bottom plate parallel to and spaced from the platform and secured to the downwardly directed flanges of the base and having at each end thereof laterally disposed unitary box-like housings for strengthening said base and for enclosing latching means associated with said base, said housings having the tops thereof formed by the platform, the bottoms thereof formed by the bottom plate, and the ends thereof formed by the downwardly directed side flanges.

5. In a grave vault, a hollow unitary base member comprising a platform having downwardly directed flanges terminating in upwardly directed outwardly offset flanges, and a co-extensive bottom plate parallel to and spaced from the platform and secured to the downwardly directed flanges of the base and having at each end thereof laterally disposed unitary box-like housings for strengthening said base and for enclosing latching means associated with said base, said housings having the tops thereof formed by the platform, the bottoms thereof formed by the bottom plate, the ends thereof formed by the downwardly directed side flanges, and one side thereof formed by the downwardly directed end flanges of the base.

6. In combination, a vault base plate having an inwardly spaced struck-up portion and laterally extending flanges at the bottom forming a hollow bottom, a bottom reinforcing plate extending across said bottom to enclose it at least partially, locking mechanism arranged between said base plate and said reinforcing plate and movably supported on one of said plates so that a portion thereof will move through the sides of said base plate, and means for actuating said locking mechanism located between said base plate and said reinforcing plate and pivotally mounted upon one of said plates, said actuating means partially extending therebeyond at the end of the base plate.

7. In combination, a grave vault base comprising a centrally arranged struck-up portion having a marginal flange at the bottom thereof, reinforcing plates on the bottom of said base extending across at least a portion of said base sufficient to reinforce the base and to form with the base an enclosure for locking mechanism, and locking mechanism mounted on both said reinforcing plate and upon said base.

8. In combination, a grave vault base comprising a centrally-arranged struck-up portion having a marginal flange at the bottom thereof, reinforcing plates on the bottom of said base extending across at least a portion of said base sufficient to reinforce the base and to form with the base an enclosure for locking mechanism, and locking mechanism mounted on said reinforcing plate and upon said base, the portion of the locking mechanism mounted on the base being pivoted thereon so that a portion thereof will swing through the side walls thereof and another portion mounted on the reinforcing plate being adapted to position said swinging locking means extended through the end of the base.

9. In a grave vault base, the combination of a vault base having a centrally arranged struck-up portion with marginal flanges at the bottom thereof, a reinforcing plate adjacent said bottom flanges and extending across at least a portion of said base on the underside thereof, and locking mechanism pivotally mounted on said reinforcing plate and having a portion extending beyond said plate over said flange of the base, and other portions connected thereto pivotally mounted on said base and adapted to swing through apertures in the sides thereof.

10. In a grave vault, a hollow unitary base member comprising a platform having downwardly directed flanges terminating in laterally extending flanges, a co-extensive bottom reinforcing plate parallel to and spaced from the platform and secured behind said flanges of the base, locking means pivotally mounted adjacent the side walls of said unitary base adapted to swing through apertures in the sides thereof, an actuating means therefor pivotally mounted on said bottom plate centrally between the oppositely disposed swinging locking members pivoted on the unitary base, and means associated with said means for actuating the swinging locking members which extend through the end of said unitary base and beyond so that the locking members can be actuated when the cover of the vault is mounted on the flanges on the base.

RALPH E. SMITH.